United States Patent [19]

Gross et al.

[11] 3,715,914
[45] Feb. 13, 1973

[54] ON SITE PRESSURE VESSEL INSPECTION DEVICE

[75] Inventors: Leonard B. Gross; Charles R. Johnson, both of Lynchburg; Stephen C. Nattsas, Bedford, all of Va.

[73] Assignee: The Babcock & Wilcox Company, New York, N.Y.

[22] Filed: Oct. 12, 1970

[21] Appl. No.: 79,831

[52] U.S. Cl. ............................... 73/67.7, 176/19 R
[51] Int. Cl. ................................. G01n 9/24
[58] Field of Search. 73/67.7, 67.8; 176/19 R, 19 LO, 176/19 J, 26

[56] References Cited

UNITED STATES PATENTS

| | | | |
|---|---|---|---|
| 2,618,968 | 11/1952 | McConnell | 73/67.7 |
| 3,332,278 | 7/1967 | Wood et al. | 73/67.7 |

*Primary Examiner*—Jerry W. Myracle
*Attorney*—J. Maguire

[57] ABSTRACT

A remotely controlled method for the non-destructive inspection of the primary pressure containment means of a nuclear reactor, on the site of use, for the detection of degradation resulting from sustained exposure to radiation. This method utilizes dual probes operating on a send-and-receive basis, wherein an ultrasonic beam is sent into a thick vessel wall describing a V-like path in the same. The transducers are fixed with respect to each other, and are transported about a programmed course in fixed relation to the vessel, so as to allow the beam to inspect 100 percent of the steel in such wall. If a defect was present in the steel, it would interfere with the path of the ultrasonic beam and a corresponding loss of energy would be detected and recorded. A comparison of the record of signals resulting from this inspection, with an established pattern of signals having its inception prior to service would indicate the initiation and propagation of a defect so that, if necessary, remedial procedures could be undertaken.

10 Claims, 4 Drawing Figures

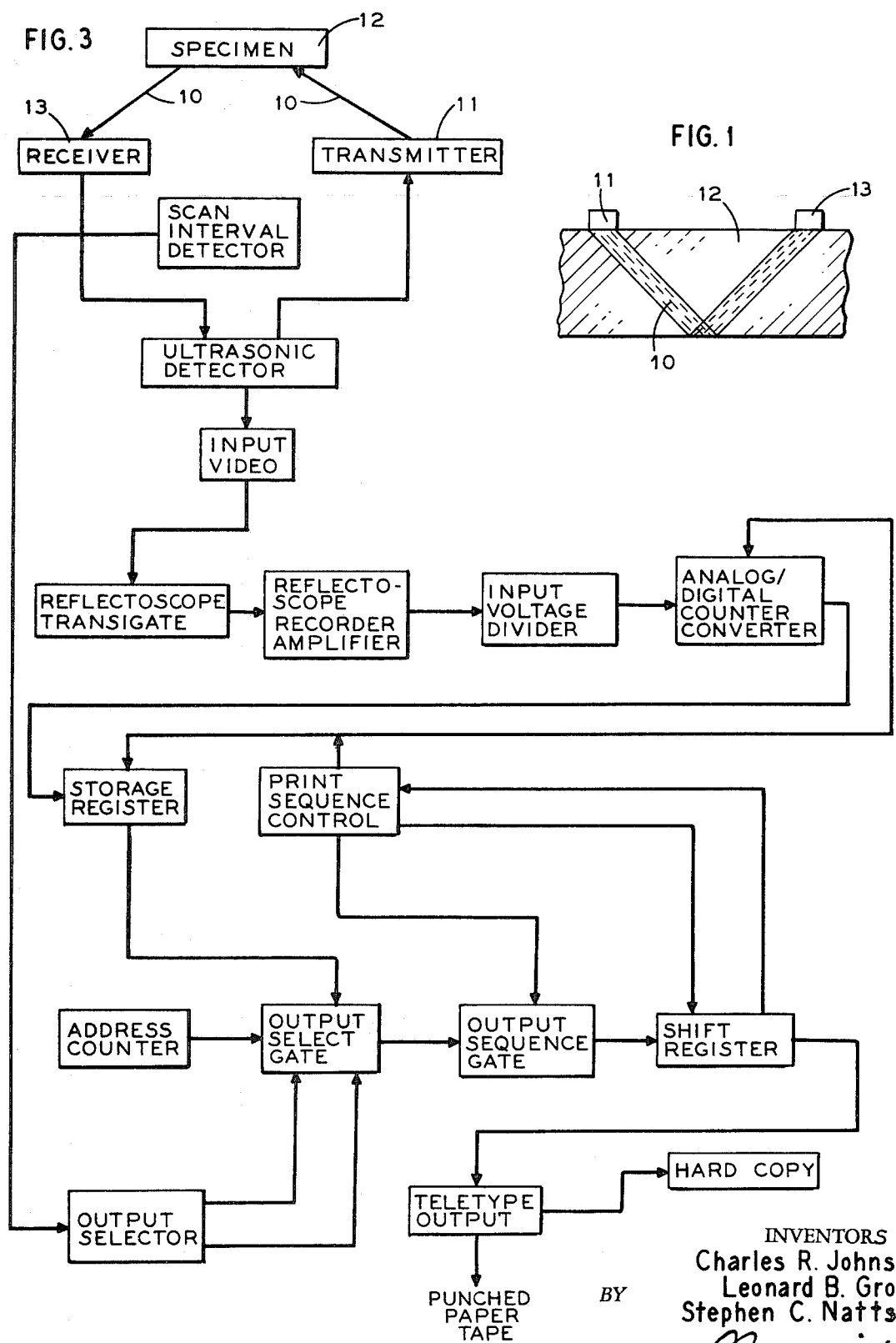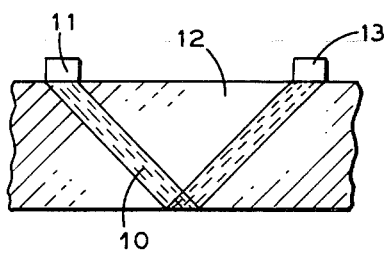

PATENTED FEB 13 1973

ON SITE PRESSURE VESSEL INSPECTION DEVICE

This invention relates to an improved method of inspecting the primary pressure-containment means of a nuclear reactor for degradation of a mechanical nature resulting from exposure to radiation for a prolonged period of time.

More particularly, this invention relates to an improved acoustical method for the rapid, programmed and continuous inspection of a precise series of multiple points within a pressure vessel of a nuclear reactor to detect mechanical degradation of such vessel from excessive exposure to radiation.

The safety factor relative to a nuclear installation dictates the the soundness of the elements of the power-generating system be periodically determined, by inspection during service and preferably on the site of use while being recharged with fuel for further operation. In this regard, of primary concern is the main pressure-containment means of the reactor itself which is an extremely large vessel composed of steel. It is known that neutron irradiation causes changes in the physical properties of steel. Therefore, this element must undergo relatively minute and exacting study to uncover the precise location of changes, of even a minute nature, in the inherent structure of such vessel so that any potentially hazardous situation may be avoided. For instance, the inception and propagation of cracking and discontinuities must be reliably detected and charted so that repair procedure, if necessitated, might be started.

In the art, there are conventional non-destructive methods for the examination of thick steel structures. However, these are long and tedious procedures, and the results are not always exact enough for the requirements of the present situation. Further, the present problem is unique due to the fact that the primary pressure-containment means of the reactor receives a high level dosage of neutrons and is therefore radioactive. To be more exact, during shutdown, the radiation level at the pressure vessel is in the order of 10 Rem per hour. This latter factor, alone, precludes the presence of an inspector, for any appreciable length of time, due to the biological hazard of the environment. Therefore, the method of inspecting such vessel must be carried out by an operator from a remote location relative to the vessel.

Further, of the conventional ultra-sonic means for the detection of flaws in steel, some operate on a send-and-receive mode wherein an ultra-sonic wave is introduced into a specimen by a transmitter-transducer, and such wave travels through such specimen, and is reflected and received as a signal by a receiver-transducer. However, the results obtained by such methods were never accurate, due to the lack of precision of the method itself, in relation to the particular structure under study. Also, in many cases, the specific scheme of sampling of a large structure was not representative of the overall condition of the item itself. For these reasons among others, such testing methods, as presently constituted, would never be acceptable to measure the degradation of a pressure vessel due to exposure to radiation for a sustained period of time. If in the past, for example, such testing procedures were utilized to insure the soundness of such vessels, it would require the testing of 11 million precise locations in the structure. If such data for each of these locations were to be acquired, evaluated, and recorded every 9 seconds, it would require well over a year on a 24 hour per day basis to accomplish this action and, at the end of the process, the validity of the data would be in issue for lack of precision of such procedures themselves.

The subject invention answers the aforementioned needs of the art with a convenient and reliable method of ascertaining the overall soundness of the primary pressure-containment means of a nuclear reactor by the inspection of a large multiple of precise locations throughout such vessel in a programmed manner.

It is, therefore, an object of this invention to provide a method of detecting degradation of a relatively large metal structure resulting from prolonged exposure to radiation in a rapid and accurate manner.

Another object is to provide a method wherein a base metal of a relatively large structure may be precisely tested for the degradating effects of radiation, after a sustained period of actual service, from a remote location in a rapid and continuous manner.

A further object is to provide a method for the programmed and continuous scanning on an incremental basis of a successive series of points, within the wall of a pressure vessel, in a relatively rapid manner in order to ascertain the inception and propagation of mechanical defects.

Other objects and many of the attendant advantages of this invention will be readily appreciated as the same become better understood by reference to the following detailed description when considered in connection with the accompanying drawings wherein:

FIG. 1 is a schematic view showing the general scheme of operation of the acoustical units relative to a section of a pressure vessel.

FIG. 3 is a diagrammatic view showing the operation of the system.

Similar numerals refer to similar parts throughout the several views.

Figure 4:
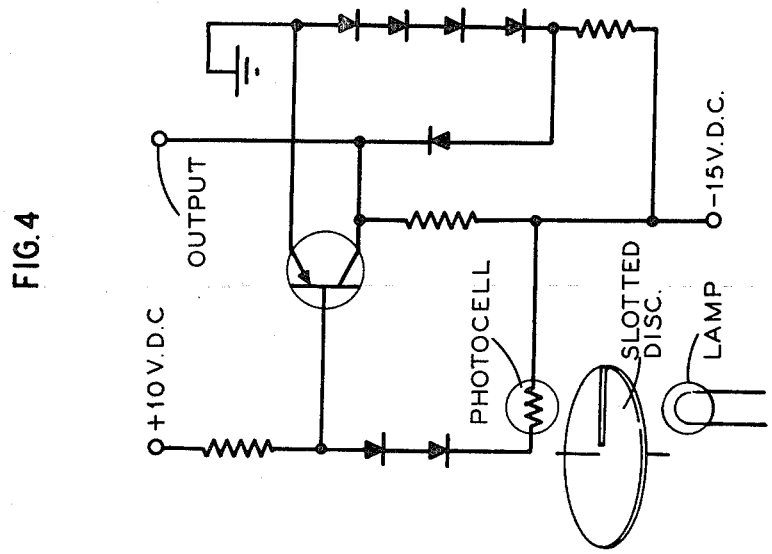
FIG. 4 is a schematic view of the circuitry of the interval detector of the system.

The present invention is based on the establishment of a precise pattern of reference signals for each of a succession of elemental regions of a relatively large vessel, prior to the service of such vessel in an environment of radiation. The pattern of signals, in this situation, is established by a through-transmission technique of scanning, in a predetermined manner, a large number of precise locations on and, inherently, in the wall of such vessel. The established pattern would then represent the lack of mechanical degradation in such vessel resulting from exposure to excessive radiation. Thereafter, if the vessel is placed in use, in an environment of excessive radiation for a sustained period of time, the overall condition of the vessel, at that point in time, may then be ascertained by the subsequent generation and establishment of an inspection pattern of signals similar to the reference pattern. In such case, the inspection signals would be established by the through-transmission technique, in a programmed sequence, in accordance with the course of precise locations of the reference pattern. The subsequent comparison of the two patterns would then identify those precise locations of elemental regions, which have undergone change in their physical characteristics, over such interval of time. Also, in this manner, one may ascertain the development of mechanical degradation due to sustained exposure to excessive radiation.

Referring now to FIG. 1, the through-transmission technique is shown wherein an ultrasonic beam 10 originating from a search unit 11, which is coupled to the surface of the pressure vessel, is directed into the wall of the vessel. This sonic energy, if uninterrupted, progresses at an angle of about 45 degrees to the far surface of the vessel 12, where it is reflected to a receiver 13, the latter being also coupled to the surface, in a fixed location, relative to the search unit 11. The ultrasonic beam is a directional sound wave of relatively high frequency, about 1 to 10 MHz, emitted by a transmitter-transducer or search unit 11, and its loss of signal or attenuation is measured on passage and reflection through the specimen 12 by a receiver-transducer 13. The signal from the latter device is displayed by conventional means such as an oscilloscope. In this technique, a signal having maximum height, signifying the reception of an uninterrupted beam would indicate the lack of degradation of the vessel at a precise location. If the beam is interrupted by a defect in the steel, part of the beam would be deflected away from the receiver 13. As a result, only part of the transmitted sonic energy would be received by the receiver 13, and a signal which is decreased in amplitude would be displayed. Total occlusion of the beam 10 by a defect would cause the signal to be reduced to zero, and no display would result. The retention of data from such ultrasonic inspection can be accomplished by direct recording of the displayed signal on film or tape. The effects of the radiation background the vessel on such system has not been found to be significant, in relation to the signal generated and received.

Figure 2:
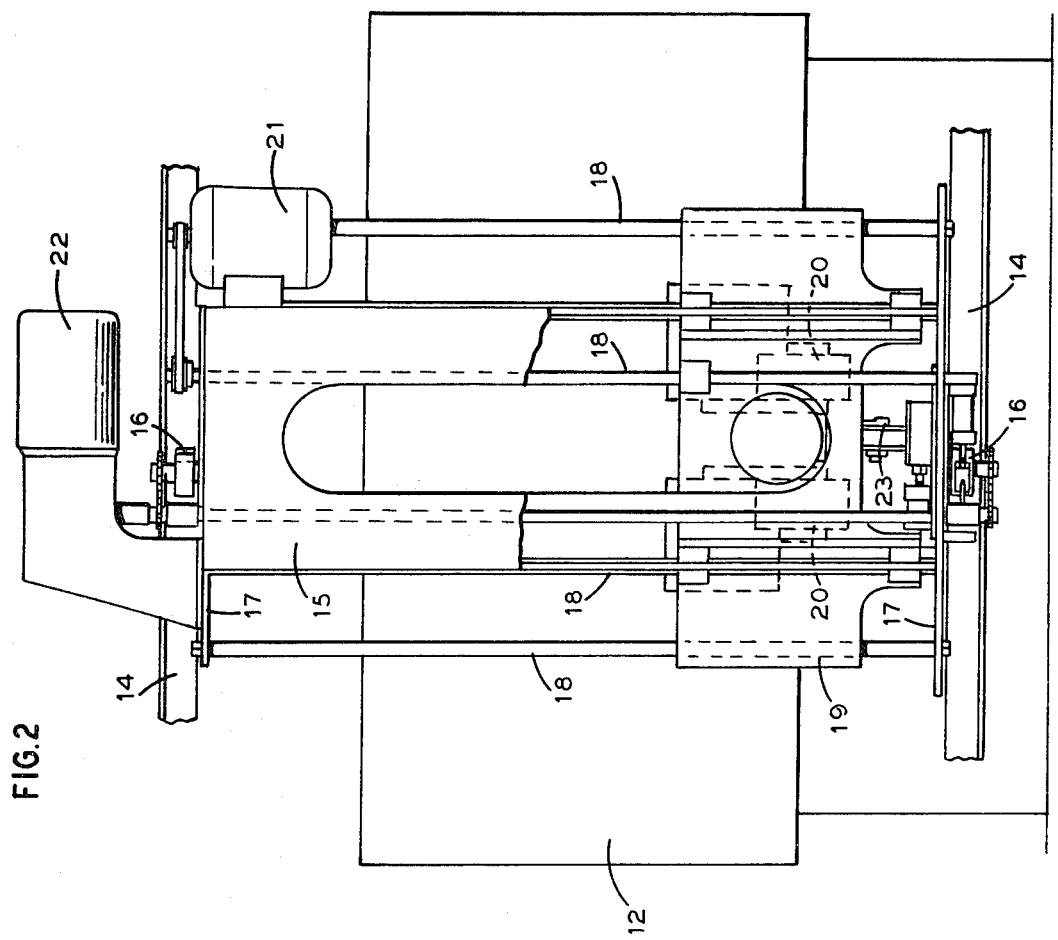
FIG. 2 is a front view showing the structure utilized for support and transport of the acoustical apparatus of FIG. 1.

To obtain comparative and meaningful quantitative values from this inspection procedure, the search and receive units 11, 13 must be precisely and rigidly fixed relative to each other, and the point of interest of the pressure vessel 12 itself. A typical mounting for use in positioning such units at a precise location on the wall of the vessel, and transporting such units, in the aforesaid fixed relationships is shown in FIG. 2. Referring thereto, an annular track 14 is affixed to the top and bottom portion of the vessel 12. A carriage support structure 15 is movably mounted on the tracks 14 by means of conventional rubber wheels 16. The support structure 15 consists of a pair of transverse members 17 which are spanned by a plurality of longitudinal rails 18 upon which such carriage 19 is movably mounted. The latter element 19 carries a pair of ultrasonic wheel-type transducers 20 in fixed relationship to the surface of the vessel 12. These transducers 20 were selected because of their ultrasonic performance and mechanical mobility, which permitted the probes to be efficiently transported about a vessel with a minimum of coupling difference. The couplant utilized was a glycerine-water solution. Also, the specific transducers utilized were of the Sperry Wheel type, of Automation Industries, which consisted of a barium titanate crystal mounted in a fluid filled tire, wherein the attitude of the crystal is maintained constant. These wheels were moved vertically on the screw driven carriage 19 by motive means 21 while continuous circular movement was provided by motive means 22. Incremental circumferential movement was provided by an indexing device 23 of the pin-in-track variety. The position location was presented digitally using conventional sequential counters.

It should be noted, that the vessel is usually made of steel and this is not a perfectly homogeneous material because of variations in the inclusion content and the grain size. Further, note should be taken of the fact that the surfaces of the vessel are not perfectly regular. All of these factors may irregularly attenuate or interrupt the ultrasonic beam. This would cause a variation in the signal ultimately received from even a vessel having a sound structure. As will be described, this effect is normalized by inspecting the vessel prior to service to establish a reference pattern characteristic of the vessel's initial or preoperational condition. Then, by a simple procedure, the amplitude values for the normal condition would then be subtracted from the values obtained in subsequent inspections and a graph of such differences in amplitude would indicate the extent of propagation of a crack during the interval of exposure.

In the establishment of a reference pattern of signals, the search and receive units 11, 13 in the aforementioned fixed relationship, were transported vertically over the vessel's surface. At the end of a vertical sweep, they were indexed to a new, but overlapping, circumferential position, and again swept vertically. This program was continued, in this manner, until the entire vessel was inspected and a reference pattern of signals was produced, which was representative of the structure prior to service. On subsequent inspection, after sustained use, the procedure would be repeated relative to precisely the same locations. This operation was carried out in a programmed manner along the same vertical course, and around the same circumferential circuit, as were used to establish the reference pattern of signals. By comparing the inspection and reference pattern of signals for the vessel, over the stated interval of service, a difference would become self-evident and may be evaluated for seriousness. For instance, if a defect, crack or abnormality developed in the structure or were propagated during service, it would disturb the scanning beam on its vertical sweep. The number of times such beam were disturbed, in adjacent sweeps, would be an indication of the depth of the flaw. The processing of the signals may be accomplished electronically, as will be described, for the rapid presentation or recording of the patterns for comparative purposes. The latter comparison may also be carried out be a computer wherein the difference in the individual signals of the several patterns may be generated, and established as an indicator signal, identifying those elemental regions which have changed during the period of service.

Due to the large amount of data, in the form of ultrasonic signals, that are generated by the aforementioned non-destructive method of inspection, recourse was had to electronic processing. As a result, such information was acquired and analyzed, in a relative rapid manner consistent with the time alloted for such inspection, during a refueling stage in the operation of the reactor. This operation was accomplished in accordance with the system depicted in FIG. 3. In general, the data in the form of signals from the receiver unit must be acquired, evaluated and recorded providing a permanent record for future comparison. In the acquiring stage, the data must be accepted from the ultrasonic inspection sensors, at predetermined intervals, sorted and, the most significant piece of data during that particular interval must be selected for further processing. This latter piece of data must be evaluated by digitalization and addressed with the specific physical location on the vessel, as the specific point of origin of the signal received. The data is then presented in a form that is applicable to further processing. These functions were all coordinated in sequence and timing to insure a consistent format of data output.

To be more specific, the video signal or displayed pulse acquired from the receiver was first gated and integrated to provide a d-c signal whose amplitude was proportional to the pulse height. This analog signal was then converted to digital form. Simultaneously, an addressing system monitored the location of the sensors relative to the vessel and supplied an address, along with the digitalized data, to a shift register which converted the parallel digital information into serial form for transmission to an output station or teletypewriter. The output was in the form of printed copy or punch paper type as desired. Control and timing was achieved through digital logic configurations whose inputs originated in the inspection system's control circuits.

In the data acquisition stage, the data from the receiver-sensor is monitored over a vertical travel interval of 0.10 inch, and the largest deviation in signal within that distance is taken as characteristic of the entire interval. This particular interval is precisely located for coordination of data and address from inspection to subsequent inspection. This was accomplished by monitoring the rotation of the drive means, for the vertical movement of the transporter and supplying a specific signal for each rotation which would represent 0.10 inch of vertical travel. A schmatic of the circuitry involved is shown in FIG. 4. A slotted disc mounted on top of drive means allowed a light beam to pass directly to a photocell once during each rotation of the drive screw. The resultant change in resistance of the photocell was used to vary a voltage placed on the input of a transistor switching circuit. This signal was then characteristic of the entire interval spanned.

Also, in the data sorting and selection stage of the method, the sensor data in the form of pulse heights are monitored over the duration of such interval of acquisition. During this interval, the lowest pulse height, characterized as maximum deviation, is retained as representative of the entire spanned interval. A d-c output having a level proportional to the pulse heights was supplied by the specific inspection instrumentation utilized in the system, i.e. a Sperry Reflectoscope UM 700 equipped with a Style 50E550 Transigate and a type — S Recording Amplifier. The d-c level was then fed through an adjustable voltage divider for further flexibility in calibration. The output of the divider is the input to a analog-to-digital counter converter, which supplied a digital count representative of the d-c level input, so that only the value of the lowest pulse height is retained during an acquisition interval, and this value is in digital form. At the end of a scan interval, this value is transferred to a buffer register where it is retained for print out while the counter converter is reset to the zero state.

In the addressing stage of the method, the data acquired is indexed to the actual physical location on the pressure vessel. The address was directed to position on a vertical column on the vessel because the data within a column always started at the same height and proceeded sequentially from that point. As long as the address of the vertical column is known in relation to the circumference, the point of interest can be related directly to the location on the vessel. A conventional digital counter was used to monitor vertical travel upon receipt of a signal from the index circuit in the inspection system. The counter accurately follows the position of the inspection carriage and was utilized to monitor at least 64 circumferential positions but could be expanded to monitor a greater number. As the sensor carriage travels around the circumference of the vessel, a pulse is sent to the counter for each position it passes, and this count is also available for printout.

After being digitalized, the data from the sensors and its address are in parallel form and must be transmitted in the form of a serial code to be accepted by the output station for production in the form of hard copy. The output selector determines whether data or address information is to be presented to the output sequence gate. The selector obtains signals from the control panel of the data system, and the control circuitry of the inspection system. When the selector receives a signal from one of these external sources, it switches to either the address or data mode. A signal having a logic level determined by the mode selected is then sent to the output select gate, where data and address are present, and the logic level will combine with either address information or data and pass it to the output sequence gate, as binary information, in parallel form. At this point, the output sequence control is activated and supplies the latter data, in accepted form, to a shift register for transmission to the output station or teletypewriter in proper code and sequence for printout. The shift register sends back a character completion signal to the print sequence control, which then proceeds until all characters are printed out.

The aforesaid processing of data is accomplished in a fairly rapid manner, and the hard copy received from the output station for each of the patterns may be compared for differences. In the alternative, the two separate patterns may be processed by computer, in a fairly rapid manner, to yield a print of differences for the vessel under study. This could be easily accomplished by the generating and establishing an indication signal representing differences between the respective patterns and this would indicate a change in condition during the interval of service of the vessel under study.

It is evident that by the method of the present invention, changes in the inherent condition of the primary pressure-containment means of a nuclear reactor may be ascertained, by fully surveying the entire volume of the structure in a rapid, continuous and automated manner over a span of time. This method is able to detect discontinuities in the inherent structure that may occur during operation, and to distinguish them from acceptable benign inhomogeneities in the original condition of a relatively large pressure vessel, prior to service. The method is highly accurate and its precision is based, among other things, on the constant communications between an acoustical search and receive unit, which would be interrupted by any structural abnormality, for a dynamic determination of the condition of such vessel. The relative rapidity with which the process is positively carried out is of extreme importance to industry because of the astronomical cost of time, of the out-of-service period, of say an electric generating installation, which is dependent on such pressure vessel for continuous operation.

What is claimed is:

1. A method of inspecting a pressure vessel of a nuclear reactor to ascertain the development of mechanical degradation from exposure to excessive radiation which comprises:
    establishing a precise reference signal for each of a succession of elemental regions of said pressure vessel, prior to service, in a predetermined course of precise locations on said vessel's wall,
        said reference signal representing the lack of mechanical degradation in said region due to radiation,
    subsequently, generating and establishing a second signal for each of a series of said regions in a programmed sequence in accordance with said course of precise locations,
        said second signal representing the condition of said region after said vessel has been exposed to radiation for a sustained period of time, and
    comparing electronically said reference and said second signal to establish an indicator signal identifying those elemental regions which have degraded over said interval of time.

2. The method of claim 1 wherein said reference and said second signals are each electronically evaluated on a separate basis and recorded prior to comparison.

3. The method of claim 1 wherein on a separated basis, said reference and said second signal are each electronically measured, addressed with respect to location of said sensors relative to said vessel, and recorded prior to comparison.

4. The method of claim 1 wherein said reference and said second signal are each electronically processed on a separate basis prior to comparison by the steps which comprise:
    measuring said signal,
    simultaneously monitoring the origin of said signal,
    converting said measured signal to digital data,
    addressing said digital data based on origin, and
    recording said address and data in the form of permanent copy.

5. The method of claim 1 wherein said reference signal and said second signal are each electronically processed on a separate basis prior to comparison by the steps which comprise:
    accepting each of said signals in the form of a video pulse whose height is proportional to the amplitude of said established signal,
    sorting said pulses for the lowest pulse height during a specific reception interval, selecting the most significant pulse for said interval,
    converting said pulse to a digitalized form of data,
    addressing said digitalized signal with relationship to the specific origin of said signal relative to said vessel, and
    presenting said data and said address in hard copy form.

6. The method of claim 1 wherein said reference and said second signal are each electronically processed on a separate basis prior to comparison by the steps which comprise:
    accepting each of said signals in the form of a video pulse whose height is proportional to the amplitude of said establish signal,
    sorting said pulses by gating means so that only the pulse of lowest height is transmitted further,
    integrating said transmitted pulse to provide a d-c signal whose amplitude is proportional to pulse height,
    converting said d-c signal to digital form,
    monitoring the location relative to said vessel of the means generating said initial signals,
    supplying an address for said digital data based on said monitoring,
    converting said address and digital data into serial form for transmission to an output station, and
    reducing said data to permanent copy.

7. A method of inspecting a pressure vessel of a nuclear reactor to ascertain the development of mechanical degradation from exposure to excessive radiation which comprises:
    generating a reference signal for each of a succession of elemental regions of said pressure vessel in a predetermined course of precise locations on said vessel wall,
        said reference signal representing the lack of mechanical degradation in said region due to radiation,
    subsequently, generating a second signal for each of a series of said regions in a programmed sequence with said course of precise locations,
        said second signal representing the condition or said regions after said vessel has been exposed to radiation for a sustained period of time, and
    comparing electronically said reference and said second signal to establish an indicator signal identifying those elemental regions which have degraded over said interval of time.

8. A method of inspecting a pressure vessel of a nuclear reactor to ascertain the development of mechanical degradation from exposure to excessive radiation which comprises:
    examining, in depth, the interior of the wall of said vessel by means of an acoustical sensor thereby establishing a reference pattern of signals characterizing the overall condition of said vessel prior to service in an environment of radiation,
    exposing said vessel to radiation for a sustained period of time,
    subsequently, scanning the elemental regions of said exposed vessel by said sensor in accordance with said reference pattern to establish a second pattern of signals, and
    comparing electronically said reference and second signal to detect a difference representing degradation of said vessel due to radiation.

9. A method of inspecting a pressure vessel of a nuclear reactor to ascertain the development of mechanical degradation from exposure to excessive radiation which comprises:

positioning an acoustical sensor for an initial scan of each of a series of elemental regions of said vessel thereby establishing a reference pattern of signals for said vessel, characterizing the condition of said vessel prior to service in an environment of radiation based on said pattern of signals, exposing said vessel to radiation for a sustained period of time, subsequently, scanning said elemental regions of said exposed vessel by said sensor in a programmed sequence of positions in accordance with said initial scan to generate a second pattern of signal characterizing said vessel after exposure to radiation, comparing electronically said reference and second pattern to detect a difference representing degradation of said vessel due to radiation.

10. A method of inspecting a pressure vessel of a nuclear reactor to ascertain the development of mechanical degradation from exposure to excessive radiation which comprises:

positioning an acoustical sensor on a mobile transport for movement on each of a series of fixed vertical courses around a fixed circuit relative to said vessel, scanning by said sensor of a successive series of elemental regions of said vessel along each of said courses to generate a successive series of signals representative of each of said regions, establishing a reference condition for said regions of said vessel based on said signals prior to service of said vessel in an environment of radiation, exposing said vessel to radiation for a sustained period of time, subsequently, scanning said elemental regions of said exposed vessel by said sensor in a programmed sequence of positions along said fixed courses and circuits to generate a second series of signals representing said regions, and comparing electronically said reference and said second signal to detect a difference representing degradation of said vessel due to radiation.

* * * * *